(12) United States Patent
Lewis et al.

(10) Patent No.: US 6,826,306 B1
(45) Date of Patent: Nov. 30, 2004

(54) SYSTEM AND METHOD FOR AUTOMATIC QUALITY ASSURANCE OF USER ENROLLMENT IN A RECOGNITION SYSTEM

(75) Inventors: James R. Lewis, Delray Beach, FL (US); Julia E. Maners, Boca Raton, FL (US); Kerry A. Ortega, Deerfield Beach, FL (US); Michael P. Perrone, Yorktown, NY (US); Eugene H. Ratzlaff, Hopewell Junction, NY (US); Jayashree Subrahmonia, White Plains, NY (US); Ron Van Buskirk, IndianTown, FL (US); Huifang Wang, West Palm Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,146

(22) Filed: Jan. 29, 1999

(51) Int. Cl.$^7$ .............................. G06K 9/00; G06K 9/62; G10L 15/06
(52) U.S. Cl. ........................ 382/187; 382/228; 382/119; 704/244
(58) Field of Search ................................. 382/187, 189, 382/229, 230, 228, 159, 119, 160, 161, 186, 188; 704/231, 243, 244; 340/825.34; 713/186

(56) References Cited

U.S. PATENT DOCUMENTS

| | | | | |
|---|---|---|---|---|
| 4,495,644 A | * | 1/1985 | Parks et al. ................. | 382/123 |
| 4,724,542 A | * | 2/1988 | Williford .................... | 382/119 |
| 5,127,055 A | * | 6/1992 | Larkey ....................... | 704/244 |
| 5,333,209 A | * | 7/1994 | Sinden et al. ............... | 382/187 |
| 5,434,928 A | * | 7/1995 | Wagner et al. .............. | 382/187 |
| 5,502,774 A | * | 3/1996 | Bellegarda et al. ......... | 382/159 |
| 5,706,397 A | * | 1/1998 | Chow ......................... | 704/243 |
| 5,892,824 A | * | 4/1999 | Beatson et al. ............. | 713/186 |
| 5,897,616 A | * | 4/1999 | Kanevsky et al. .......... | 704/246 |
| 6,052,481 A | * | 4/2000 | Grajski et al. .............. | 382/187 |
| 6,157,731 A | * | 12/2000 | Hu et al. .................... | 382/119 |
| 6,430,305 B1 | * | 8/2002 | Decker ....................... | 382/116 |

* cited by examiner

Primary Examiner—Mehrdad Dastouri
(74) Attorney, Agent, or Firm—F. Chau & Associates, LLC

(57) ABSTRACT

A system and method for automatically providing quality assurance for user enrollment in a recognition system. Advantageously, the quality a new enrollment (i.e., a newly trained user-dependent prototype) is assessed before the new enrollment is accepted in place of a current enrollment. This quality check is performed by decoding stored user test data using the new enrollment, comparing the decoding results of the new enrollment to the known script used to generate the test data to obtain an accuracy score for the new enrollment, and then comparing the accuracy score for the new enrollment with an accuracy score of a previous qualified enrollment (or, in the case where there is no previous, qualified enrollment, to the accuracy of the speaker independent model). If the decoding results of the new enrollment are acceptable, the new enrollment will be used for recognition; otherwise it will be rejected and discarded.

32 Claims, 2 Drawing Sheets

SYSTEM AND METHOD FOR AUTOMATIC QUALITY ASSURANCE OF USER ENROLLMENT IN A RECOGNITION SYSTEM

BACKGROUND

1. Technical Field

The present invention relates generally to data recognition systems and, more particularly, to a system and method for automatically assuring the quality of user enrollment in a recognition system.

2. Description of Related Art

In general, user enrollment is a process in which training data is collected from a user (e.g., acoustic utterances of spoken words in a speech recognition system and handwriting data in a handwritten text recognition system) for the purpose of training a recognition system to recognize user-specific input data (e.g., spoken words and handwriting). In general, the enrollment process comprises two key steps: (1) collecting training data from a user seeking enrollment in the recognition system; and (2) processing the input training data to create a user-dependent prototype (e.g., a user-specific statistical model used for decoding user-specific data). To decode input data from non-enrolled users, a recognition system will apply a user-independent prototype (e.g., a user-independent statistical model which is trained on data from a random population of individuals).

Typically, user enrollment provides improved recognition performance for user-specific data. For instance, higher decoding accuracies and faster recognition speeds may be obtained when decoding user-specific data with a corresponding user-dependent prototype as compared to the decoding results and processing speeds obtained when decoding the user-specific data with a user-independent prototype. In some cases, however, enrollment can provide degraded recognition performance. For example, less than optimal decoding accuracy may be obtained in a speech recognition system if the user speaks markedly different during enrollment from the way the user typically speaks during normal use of the recognition system, or if user enrollment is performed in an environment which is markedly different than the environment in which the recognition system is normally used. In these situations, increased recognition accuracy may be obtained by decoding the user's spoken words with the recognition system's speaker-independent prototype (as compared to using the speaker-dependent prototype).

There are other situations in which enrollment may result in degraded system performance. For instance, degraded system performance may be realized when "unsupervised enrollment" is performed. Unsupervised enrollment refers to the process of collecting whatever training data the user desires to provide. For instance, with unsupervised enrollment in speech recognition, the system will record input acoustic utterances of a user's random dictation. If the recognition system does not check (or if the user is not afforded the opportunity to determine) the accuracy of the speaker-dependent model, however, unsupervised enrollment may result in degraded performance in situations where the acoustic data collected for a specific training period is poor. On the other hand, in a "supervised enrollment", the user will recite from a predetermined text (scripted text). Since the recognition system has a priori knowledge of the recited text, supervised enrollment ensures the closest possible match between what the user spoke and what the system assumed the user spoke.

Degraded recognition performance may also result for various reasons when the speech recognition system is embedded in a small device such as a personal digital assistant (PDA) as opposed to a desktop system. For example, memory restrictions of the PDA typically limit the amount of enrollment data that can be stored and utilized for training user-dependent prototypes. In addition, many small PDA devices have either a small display or no display at all, which makes user interaction with the PDA during enrollment difficult. These limitations may increase the chances that an enrollment will produce degraded rather than enhanced performance.

Conventional recognition systems are not configured to automatically assess (or otherwise allow the user to determine) the quality of a user enrollment. Unfortunately, if the enrollment process produces a user-dependent prototype that produces degraded performance (in comparison to the performance of a currently employed prototype), the user will be subsequently faced with decreased recognition accuracy. Therefore, there is a need for a recognition system that will automatically assure the quality of user enrollment before replacing a current prototype with a newly trained user-dependent prototype.

SUMMARY

The present application is directed to a system and method for providing automatic quality assurance of a user enrollment in a recognition system. Advantageously, the present invention checks the quality of a new enrollment (i.e., a newly trained user-dependent prototype) before it is accepted in place of a current enrollment. This quality check is performed by decoding stored test data (collected from the user via known scripted text) using the new enrollment, comparing the decoding results of the new enrollment to the known script used to generate the test data to obtain an accuracy score for the new enrollment, and then comparing the accuracy score for the new enrollment with an accuracy score of a previous qualified enrollment (or, in the case where there is no previous, qualified enrollment, to the accuracy of the speaker independent model). If the decoding results of the new enrollment are acceptable, the new enrollment will be used for recognition; otherwise it will be rejected and discarded.

In one aspect of the present invention, a method for assuring the quality of user enrollment in a recognition system comprises the steps of:

training a new user-dependent prototype;

computing an accuracy score for the new user-dependent prototype;

determining if the new user-dependent prototype is acceptable by comparing the computed accuracy score for the new user-dependent prototype with a previously computed accuracy score for a current user-dependent prototype;

applying the new user-dependent prototype for recognition if the new user-dependent prototype is deemed acceptable.

In another aspect of the present invention, the recognition system may be configured to store one or more previous enrollments so, at the user's discretion, it is possible to return to previous enrollments.

These and other aspects, features and advantages of the present invention will be described and become apparent from the following detailed description of embodiments, which is to be read in connection with the accompanying drawings.

DETAILED DESCRIPTION OF PREFERRED EMBODIMENTS

It is to be understood that the present system and method described herein for providing automatic quality assurance for user enrollment may be implemented in any conventional recognition system (e.g, handwriting and speech) and is not, in any way, limited to use with or dependent on any details or methodologies of any particular recognition system. For purposes of illustration, however, present invention will be described in relation to speech and handwriting recognition systems.

Figure 1:
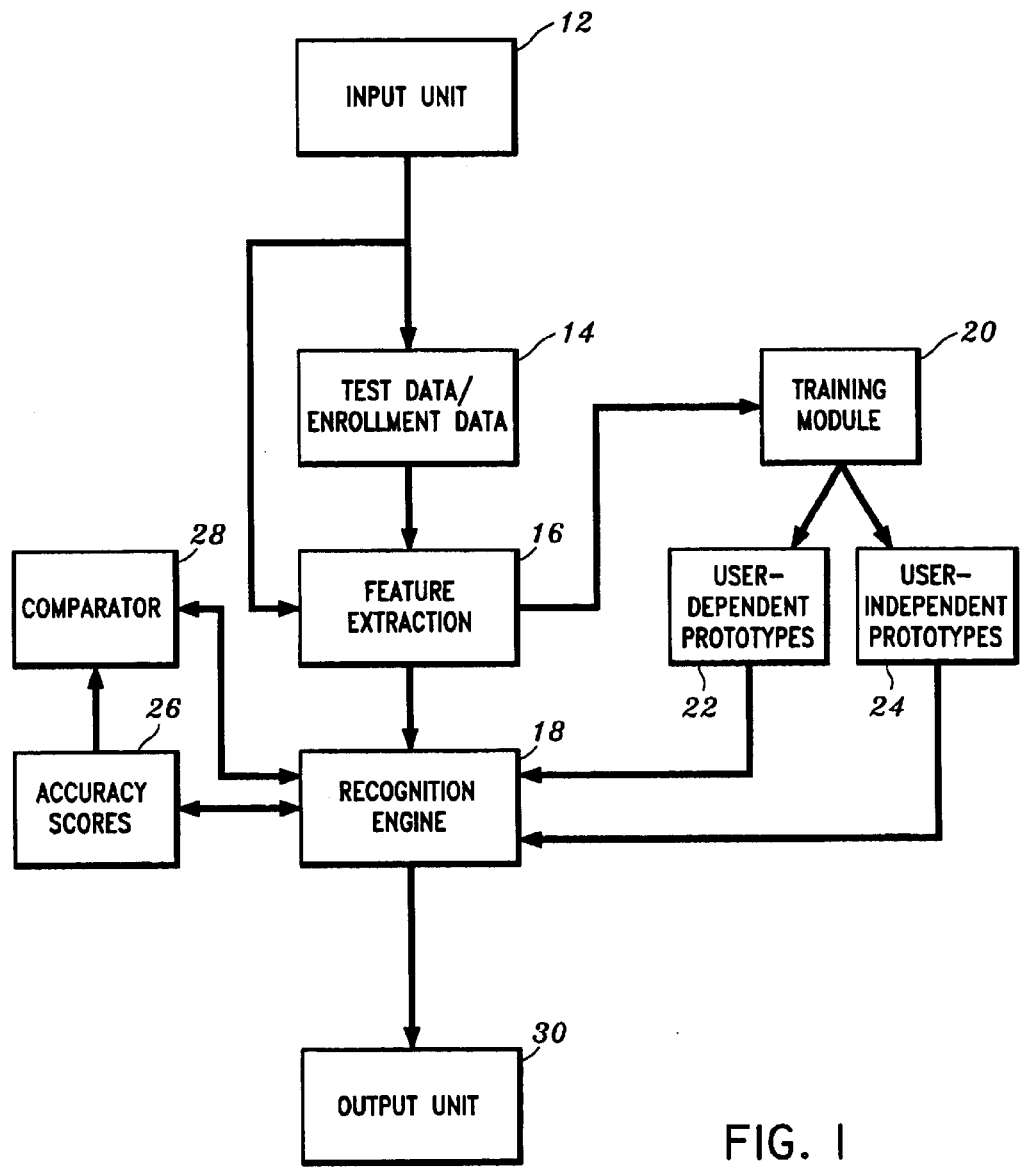
FIG. 1 is a block diagram of a system for providing automatic quality assurance for user enrollment in accordance with an embodiment of the present invention.

Referring now to FIG. 1, a block diagram illustrates a system in accordance with an embodiment of the present invention for providing automatic quality assurance for user enrollment in a recognition system. The system 10 includes an input unit 12 for inputting user data, e.g., samples of handwritten text or acoustic utterances. For instance, in a handwriting recognition system, the input unit 12 can be any conventional device for capturing handwritten text such an optical character recognition (OCR) device or a digitizing tablet (i.e., pen-based computer) for real-time digitization and recognition of text which is directly written on the tablet. In addition, for speech recognition, the input unit 12 may be a microphone (or any similar electroacoustic device) which receives and converts acoustic signals (e.g., speech data) into analog electrical signals. The input unit 12 may also include an analog-to-digital (A/D) converter to convert the acoustic analog electrical signals into digital signals.

The system 10 includes memory 14 for storing test data and enrollment data (which is collected and stored for one or more users) in any format suitable for the given data. For instance, handwriting data may be stored as a bitmap image (which is typically generated with "off-line"/"static" OCR scanning), or stored as a sequence of X-Y coordinates which represent the location of a pen writing tip on the input device 12 at successive points in time (which is generated with an "on-line"/"dynamic" pen-based computer). In addition, speech data may be digitized (via an A/D converter) and stored in its digitized version or recorded via a digital audio tape.

The enrollment data (or training data) is utilized during user enrollment to train user-dependent prototypes 22 (statistical models) via training module 20 using conventional methods suitable for a given data recognition system. For example, the user-dependent prototypes 22 can be built using Gaussian mixture models which are computed from a collection of clustered feature data. The feature data is extracted from the stored enrollment data via feature extraction module 16 using methods known to those skilled in the art.

The system also includes a user-independent prototype 24. Preferably, the user-independent prototype 24 is previously trained and provided with the system 10. Alternatively (although not necessarily practical), the user-independent prototype 24 may be generated by the user. In this situation, training data comprising a representative set of data samples from each individual in a random population of individuals would be used to create the user-independent prototype 24 using conventional training methods suitable for a given recognition system.

The user-independent prototype 24 may be utilized by recognition engine 18 in various situations such as decoding input data of non-enrolled users. It is to be understood that the recognition engine 18 may implement any of the conventional recognition techniques well-known to those skilled in the art such as those based on Viterbi alignment and Hidden Markov models for decoding speech data (or handwriting data). In particular, the user-independent prototype 24 is utilized by the recognition engine 18 during an initial phase of user enrollment to decode "test data" of a given user. As explained in detail below, the decoding accuracy obtained when decoding the user "test data" with the user-independent model is used to assess the quality of a user enrollment before the corresponding user-dependent model is accepted.

The system 10 includes a database of recognition accuracy scores 26 and an accuracy score comparator module 28, which (as explained in detail below) are used by the system to assess the quality of a user enrollment. The database 26 includes at least one accuracy score for each currently employed enrollment in the system. The recognition accuracy comparator module 28 compares an accuracy score of a new user enrollment with a previously stored accuracy score associated with a previously qualified enrollment (i.e., current enrollment) to assess the quality of the new enrollment (as explained in further detail below with reference to FIG. 2).

The system 10 also includes an output unit 30 which may be any conventional display device such as a computer monitor with a suitable graphical user interface (GUI) for displaying recognition results and allowing a user interact with the system 10 such as during user enrollment.

It is to be understood that the present system and method described herein may be implemented in various forms of hardware, software, firmware, or a combination thereof. For example, the feature extraction module 16, the training module 20, the recognition module 18 and the comparator module 28 are preferably implemented in software as an application program which is executed by a recognition machine having any suitable and preferred microprocessor architecture. It is to be further understood that, because some of the constituent system components and method steps of the present invention described herein are preferably implemented as software modules, the actual connections shown in FIG. 1 (or the process steps illustrated in FIG. 2.) may differ depending upon the manner in which the present invention is programmed. Of course, special purpose microprocessors may be employed to implement the system. Given the teachings herein, one of ordinary skill in the related art will be able to contemplate these and similar implementations or configurations of the present system and method.

Preferably, the system illustrated in FIG. 1 is implemented on a desktop computer platform including hardware such as one or more central processing units (CPU), a random access memory (RAM), and input/output (I/O) interface(s). The computer platform also includes an operating system and microinstruction code. The various processes and functions described herein such as feature extraction, training, recognition, and accuracy score comparison may either be part of the microinstruction code or part of an application program which is executed via the operating system. In addition, various other peripheral devices may be connected to the computer platform such as an additional data storage device and a printing device.

Figure 2:
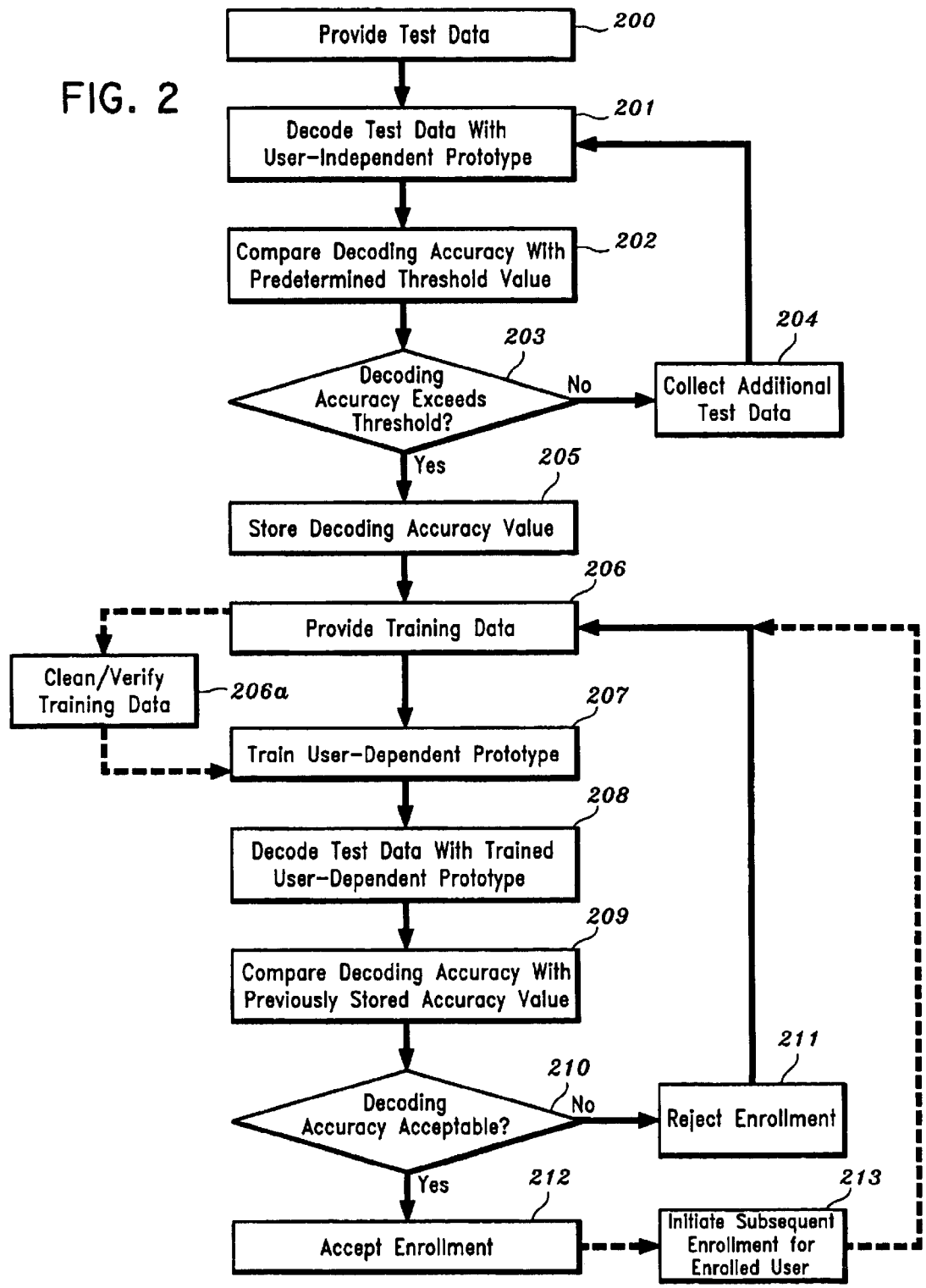
FIG. 2 is a flow diagram of a user enrollment method in accordance with one aspect of the present invention.

Referring now to FIG. 2, a flow diagram illustrates a method in accordance with one aspect of the present invention for automatically assuring the quality of user enrollment in a recognition system. Assuming (for illustrative purposes) that a user wants to enroll in a speech recognition system. Initially, the user would be prompted to read from a predetermined script (scripted text method) while speaking into a microphone and the system would collect test data by recording all, or a portion of, the user's speech utterances (step 200). It should be noted that the test data preferably comprises, at a minimum, speech samples that are representative of each of the phonemes in the language being recognized (e.g., between 40 and 45 phonemes in English, depending on the specific categorization method). Similarly, for handwriting recognition, the test data preferably comprises handwritten words of a predetermined script having, at a minimum, at least one representative of each letter in the language (for letter-based languages). For some languages such as Chinese, however, this might not be possible.

It is to be understood that in recognition systems which allow a user to create a "user profile" during the initial phase of user enrollment, test data may be collected concurrently with the data collection process used for generating the "user profile." In general, a "user profile" refers to a set of default recognition parameters which are determined to be specific to the user and automatically applied by the recognition engine for decoding input data from the user. For example, in a speech recognition system, feature data extracted from the user's test audio may be clustered (using suitable clustering techniques known in the art) to assign the user to a particular statistical group or class such as a male/female and/or adult/child class. Accordingly, a portion of the recorded test audio may be used as the test data.

Next, the test data is decoded by the recognition engine using the user-independent prototype, and the decoding results are processed to compute an accuracy score (step 201). Since the test data is collected via a known scripted text, the accuracy score may be computed by ratioing the amount of correctly recognized words in the test data to the number of incorrectly recognized words. The computed accuracy score is then compared with a predetermined accuracy threshold value (step 202). The predetermined accuracy score is set based on the specific application to ensure the quality of the test data.

A determination is then made as to whether the accuracy score exceeds a predetermined accuracy threshold (step 203). If the accuracy score does not exceed the threshold (negative result in step 203), the test data (or a portion of the test data) may be discarded and the user may be prompted to provide additional test data (step 204). In particular, depending on the accuracy score, the user may be prompted to provide the additional test data, for example, by reciting the entire scripted text or by reciting only the incorrectly recognized words. The additional test data is then decoded using the user-independent model (return to step 201) and the decoding results are analyzed (steps 201 and 202). On the other hand, if the accuracy score exceeds the predetermined accuracy threshold (affirmative result in step 203), then the accuracy score is stored in memory (step 205) and associated with the user.

Then, the enrollment process is initiated by prompting the user to provide training data (step 206). Preferably, the training data comprises spoken words of a predetermined script (supervised enrollment). Alternatively, the training data may comprise spoken words of a random script (unsupervised enrollment). After a sufficient amount of training data has been recorded, a user-dependent (speech) prototype is trained using the input training data (step 207).

Next, the user's recorded test data is retrieved from memory and decoded by the newly trained user-dependent prototype to compute an accuracy score for the new user-dependent prototype (step 208). As explained above, since the recorded test data is collected using known text, the decoding accuracy of the user-dependent prototype may be determined by ratioing the amount of correctly recognized words to the number of incorrectly recognized words. The computed accuracy score for the user-dependent prototype is then compared with the previously stored accuracy score (step 209) to determine, for example, the amount (percentage) of increase or decrease in recognition accuracy obtained by decoding the test data using the new user-dependent prototype as compared to the user-independent prototype (or currently employed user-dependent prototype).

Next, a determination is made as to whether the accuracy score is acceptable (step 210). It is to be appreciated that the acceptance process (i.e., step 210) may be performed either automatically, or manually through user interaction. For instance, the system can be configured to automatically accept (i.e., no user interaction) the new enrollment if the accuracy score of the new enrollment exceeds the accuracy score of the user-independent prototype by some predetermined accuracy threshold. The predetermined threshold may be either a preprogrammed default value (initially provided with the system), a user-selected default value (which the user can periodically change, if desired), or a combination of both. It is to be understood that any value can be selected for the accuracy threshold value. For example, the threshold value can be prespecified such that the system will automatically accept an enrollment if its computed accuracy score is at least 5% better than the accuracy score associated with the user-independent prototype (or a currently employed qualified enrollment). In addition, the threshold value may be prespecified such that the system will automatically accept an enrollment if its accuracy score is not more than 5% lower than the accuracy score associated with the user-independent prototype (or a currently employed qualified enrollment). In some situations, an enrollment may be acceptable where the benefits associated with the increased decoding speed which is obtained using the new user-dependent prototype as compared to using the user-independent prototype may outweigh the disadvantage of using a somewhat less accurate enrollment.

Alternatively, the acceptance process (step 210) may be performed manually through user interaction. In this situation, the computer may display, for example, the computed decoding accuracy of both the user-independent and user-dependent prototypes and prompt the user to either accept or reject the new enrollment.

If the accuracy score of the user-dependent prototype is not acceptable (negative result in step 210), the enrollment process will be rejected (step 211) (i.e., the user-dependent prototype will not be used for recognition). In this situation, the user may be prompted to provide the requisite training data (return to step 206), and then the decoding/evaluation process is repeated (steps 207 through 209). If, on the other hand, the accuracy score of the user-dependent prototype is acceptable (affirmative result in step 210), the enrollment will be deemed qualified and applied as the current recognition prototype used for recognition (step 212).

As demonstrated above, for a first-time user enrollment, the previously stored accuracy score (which is accessed in step 209) is the accuracy score computed from the decoding results obtained by decoding the test data with the user-independent prototype. Therefore, in this instance, the quality of the initial user-dependent prototype is based in relation to the decoding accuracy of the user-independent prototype. It is to be appreciated that a subsequent enrollment process may be initiated for any enrolled user (step 213) whereby the enrollment process described above will be repeated (steps 206 through 212). The enrollment process may be initiated, for example, upon request of an enrolled user or automatically by periodically prompting the enrolled user during the course of use of the recognition system. In this situation, an accuracy score can be computed for the newly trained user-dependent model (step 208) and compared with the previously stored accuracy score (in step 209) associated with the current user-dependent prototype (i.e., the last previously accepted user-dependent prototype). Accordingly, the present invention advantageously provides quality assurance for a user enrollment by rejecting (automatically or manually) an enrollment having an accuracy score which is deemed unacceptable as compared to the accuracy score of a continually replaced with, for example, a more accurate prototype to thereby enhance the recognition accuracy of the system.

It is to be appreciated that in another embodiment of the present invention, one or more previous user-dependent prototypes (which are replaced by more accurate user-dependent prototypes) may be stored and accessed for recognition at the user's discretion. A user may want to utilize a previous enrollment when, for example, the user perceives (either correctly or incorrectly) that better recognition performance was obtained with a previous enrollment, despite the system (or the user) having accepted the current enrollment. In addition, the user may want to utilize a previous enrollment that the user believes is more biased towards the user's current speaking or writing style, for instance.

It is to be further appreciated that in order to enhance recognition performance and assure quality enrollment, the present system and method may be configured to periodically update/replace the stored the test data with better quality test data. This feature is particularly useful in situations when the test data used for quality assurance is collected from the user during early use of the recognition system (for example, when the user may feel uncomfortable or awkward speaking to the computer and may not speak normally). This process may be user-initiated, whereby the user can provide speech utterances while reciting a scripted text (as discussed above). Alternatively, the test data collection process may be automatically implemented. For instance, the new test data may be collected during user enrollment while the user recites from a supervised enrollment script. In this manner, a portion of the training data would be utilized as the new test data. Preferably, the test data should comprise a portion of the enrollment data recorded near the end of the enrolled script during a time when it may be presumed that the user is speaking in a more natural manner. Consequently, the preferred method would be to collect the test data after the user had been enrolling for a while, for example, just before the end of the script.

The quality of the new test data can be verified (in relation to the current test data) by decoding the new test data and the stored (current) test data using the current prototype (i.e. the last accepted user-dependent prototype or the user-independent if no enrollment has yet been accepted) and comparing the decoding results. If the accuracy score obtained using the new test data is acceptable, the new test data can replace the previously recorded test data and subsequently applied for assessing the quality of the new enrollment.

It is to be appreciated an automated data cleaning process may be implemented in accordance with another aspect of the present invention for cleaning the collected training data prior to decoding the data. For instance, referring to FIG. 2, the collected training data (step 206) may be cleaned/verified (step 206a) to protect against corrupted data. The cleaning/verification process includes decoding the enrollment data with the current user-dependent prototype (or the user-independent prototype if no enrollment has yet been accepted). Then, for each spoken word in the enrollment data, the decoding results are analyzed by calculating the difference between the model's score for its top answer and the correct answer. The user may then prompted to recite (from the enrollment script) each word, if any, having a calculated difference which exceeds a prespecified threshold (i.e. those words which the model is most inaccurate). This prespecified selection threshold may be varied as a function of the recognition accuracy. The verification process is particularly useful for implementation in handwriting recognition since people frequently do not write the enrollment script exactly.

In another aspect of the present invention, unsupervised enrollment may be automatically performed. For instance, the present invention may be configured to automatically perform unsupervised enrollment at certain periods during normal use of the recognition system when the system has collected enough information to train for the new enrollment. It is to be understood that this continuous enrollment process may occur without any user interaction, and is robust enough to operate during power shutdown (normal or unexpected). The only indication to the user that this processing is taking place would be through some indication in the user interface, such as a change of state of a speech icon in a status tray. When this indication is provided, the interface also gives the user an option to terminate the unsupervised enrollment process. Given the assumed power of computers running this software, this would be a very infrequent user action. After a certain amount of system inactivity, processing would resume automatically.

Note that recent advancements in computer processing power enable speech recognition systems to train speech data while the system is being used for other purposes without any apparent performance degradation. For systems having significantly decreased processing power, the present invention may be configured such that a user interface would be implemented to automatically advise a user when a sufficient amount of training data has been collected to perform unsupervised enrollment as well as provide means for user-initiation of the enrollment. Regardless of whether the unsupervised enrollment process is automatic or user-initiated, the quality of the new user-dependent model would be checked against the quality of the previously qualified user-dependent model as described above.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for assuring the quality of user enrollment in a recognition system, comprising the steps of:

training a new user-dependent prototype;

computing an accuracy score for the new user-dependent prototype;

determining if the new user-dependent prototype is acceptable by comparing the computed accuracy score for the new user-dependent prototype with a previously computed accuracy score for a previously generated user-dependent prototype in a previous training process; and applying the new user-dependent prototype for recognition if the new user-dependent prototype is deemed acceptable.

2. The method of claim 1, wherein the computed accuracy score for the new user-dependent prototype is determined from decoding results obtained by decoding the new user-dependent prototype with user test data, and wherein the previously computed accuracy score for the previously generated user-dependent prototype is obtained by decoding the previously generated user-dependent prototype with the user test data.

3. The method of claim 2, wherein the recognition system is a handwriting recognition system and user test data comprises handwriting data of words of a scripted text.

4. The method of claim 2, wherein the recognition system is a speech recognition system and the test data comprises recorded acoustic utterances of spoken words of a scripted text.

5. The method of claim 1, wherein the step of determining if the new user-dependent prototype is acceptable includes the step of automatically accepting the new user-dependent prototype if the computed accuracy score of the user-dependent prototype exceeds the previously computed accuracy score of the previously computed user-dependent prototype by a prespecified threshold.

6. The method of claim 5, wherein the prespecified threshold is selected by the user.

7. The method of claim 1, wherein the step of determining if the new user-dependent prototype is acceptable includes the step of displaying the computed accuracy score and the previously computed accuracy score and prompting the user to select the new user-dependent prototype if the computed accuracy score is acceptable to the user.

8. The method of claim 1, further comprising the step of storing the computed accuracy score of the new user-enrollment, wherein the stored accuracy score is applied for assessing the quality of a subsequent enrollment by the user.

9. The method of claim 1, further comprising the step of one of storing and discarding the previously computed user-dependent prototype if the new user-dependent prototype is accepted.

10. A method for assuring the quality of user enrollment in a recognition system, comprising the steps of:
collecting test data from a user seeking enrollment;
computing a first accuracy score from decoding results obtained by decoding the test data with a user-independent prototype;
training a new user-dependent prototype using the test data;
computing a second accuracy score for the new user-dependent prototype from decoding results obtained by decoding the user-dependent prototype with the test data;
comparing the first accuracy score with the second accuracy score to determine if the new user-dependent prototype is acceptable; and
applying the new user-dependent prototype for recognition if the new user-dependent prototype is deemed acceptable.

11. The method of claim 10, wherein the test data is collected from scripted text.

12. The method of claim 10, further including the step of verifying the quality of the test data.

13. The method of claim 12, wherein the step of verifying the quality of the test data includes the steps of:
comparing the first accuracy score with a prespecified threshold;
accepting the test data and storing the first accuracy score if the first accuracy score exceeds the prespecified threshold; and
discarding the test data if the first accuracy score does not exceed the prespecified threshold.

14. The method of claim 13, further comprising the steps of:
collecting and decoding additional test data if the first accuracy score is determined to be less than the prespecified threshold limit; and repeating the steps of collecting and decoding the additional test data until the first accuracy score exceeds the prespecified threshold value.

15. The method of claim 10, wherein the step of training the user-dependent model includes the steps of:
collecting training data provided from the user; and
training the user-dependent model with the training data.

16. The method of claim 15, further comprising the step of cleaning and verifying the collected training data.

17. The method of claim 10, wherein the user-dependent model is automatically accepted if the second accuracy score exceeds the first accuracy score by a prespecified threshold.

18. The method of claim 17, wherein the prespecified threshold is selected by the user.

19. The method of claim 10, wherein the user-dependent prototype is manually accepted by a user.

20. A program storage device readable by a recognition machine, tangibly embodying a program of instructions executable by the machine to perform method steps for assuring the quality of user enrollment, the method steps comprising:
training a new user-dependent prototype;
computing an accuracy score for the new user-dependent prototype;
determining if the new user-dependent prototype is acceptable by comparing the computed accuracy score for the new user-dependent prototype with a previously computed accuracy score for a previously generated user-dependent prototype in a previous training process; and
applying the new user-dependent prototype for recognition if the new user-dependent prototype is deemed acceptable.

21. The program storage device of claim 20, wherein the computed accuracy score for the new user-dependent prototype is determined from decoding results obtained by decoding the new user-dependent prototype with user test data, and wherein the previously computed accuracy score for the previously generated user-dependent prototype is obtained by decoding the previously generated user-dependent prototype with the user test data.

22. The program storage device of claim 20, wherein the instructions for performing the step of determining if the new user-dependent prototype is acceptable includes instructions for performing the step of automatically accepting the new user-dependent prototype if the computed accuracy score of the new user-dependent prototype exceeds the previously computed accuracy score of the previously generated user-dependent prototype by a prespecified threshold.

23. The program storage device of claim 22, further comprising instructions for allowing the user to select the prespecified threshold.

24. The program storage device of claim 20, wherein the step of determining if the new user-dependent prototype is acceptable includes instructions for performing the steps of displaying the computed accuracy score and the previously computed accuracy score and prompting the user to select the new user-dependent prototype if the computed accuracy score is acceptable to the user.

25. The program storage device of claim 20, further comprising instructions for performing the step of storing the computed accuracy score of the new user-enrollment, wherein the stored accuracy score is applied for assessing the quality of a subsequent enrollment by the user.

26. A recognition system for assuring the quality of user enrollment, comprising:

means for training a new user-dependent prototype;

means for computing an accuracy score for the new user-dependent prototype;

means for comparing the computed accuracy score for the new user-dependent prototype with a previously computed accuracy score for a previously generated user-dependent prototype in a previous training process to determine if the new user-dependent prototype is acceptable; and means for applying the new user-dependent prototype for recognition if the new user-dependent prototype is deemed acceptable.

27. The system of claim 26, wherein the computed accuracy score for the new user-dependent prototype is determined from decoding results obtained by decoding the new user-dependent prototype with user test data, and wherein the previously computed accuracy score for the previously generated user-dependent prototype is obtained by decoding the previously generated user-dependent prototype with the user test data.

28. The system of claim of claim 27, wherein the recognition system is a handwriting recognition system and the user test data comprises handwriting data of words of a scripted text.

29. The system of claim 27, wherein the recognition system is a speech recognition system and the test data comprises recorded acoustic utterances of spoken words of a scripted text.

30. The system of claim 26, wherein the means for comparing includes means for automatically accepting the new user-dependent prototype if the computed accuracy score of the new user-dependent prototype exceeds the previously computed accuracy score of the previously generated user-dependent prototype by a prespecified threshold.

31. The system of claim 26, wherein the means for comparing includes means for displaying the computed accuracy score and the previously computed accuracy score and means for prompting the user to select the new user-dependent prototype if the computed accuracy score is acceptable to the user.

32. The system of claim 26, further comprising means for storing the computed accuracy score of the new user-enrollment and means for accessing and applying the stored accuracy score for assessing the quality of a subsequent enrollment by the user.

* * * * *